(12) United States Patent
Pan et al.

(10) Patent No.: US 9,246,856 B1
(45) Date of Patent: *Jan. 26, 2016

(54) COLLABORATIVE STREAMING OF VIDEO CONTENT

(71) Applicant: Google Inc., Mountain View, CA (US)

(72) Inventors: Yu Pan, San Francisco, CA (US); Ches Wajda, Menlo Park, CA (US); Hong Qu, San Mateo, CA (US); Maryrose Dunton, Oakland, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/196,078

(22) Filed: Mar. 4, 2014

Related U.S. Application Data

(63) Continuation of application No. 11/952,054, filed on Dec. 6, 2007, now Pat. No. 8,700,714.

(60) Provisional application No. 60/873,538, filed on Dec. 6, 2006, provisional application No. 60/875,670, filed on Dec. 18, 2006.

(51) Int. Cl.
*G06F 3/00* (2006.01)
*H04L 12/58* (2006.01)
*H04L 29/06* (2006.01)

(52) U.S. Cl.
CPC ............ *H04L 51/046* (2013.01); *H04L 65/403* (2013.01); *H04L 65/60* (2013.01)

(58) Field of Classification Search
CPC .. G11B 27/34; G11B 27/034; H04N 5/44543; H04N 5/4401; H04N 21/4622
USPC .......................................... 709/206; 715/719
See application file for complete search history.

(56) References Cited

U.S. PATENT DOCUMENTS

| | | | |
|---|---|---|---|
| 7,281,034 B1 | 10/2007 | Eyal | |
| 7,660,416 B1 * | 2/2010 | Kline | 380/216 |
| 8,032,113 B2 * | 10/2011 | Bailey et al. | 455/406 |
| 2005/0038794 A1 | 2/2005 | Piersol | |
| 2006/0074769 A1 | 4/2006 | Looney et al. | |
| 2008/0022310 A1 | 1/2008 | Poling et al. | |
| 2008/0077482 A1 | 3/2008 | Tota et al. | |
| 2008/0229215 A1 | 9/2008 | Baron et al. | |

(Continued)

OTHER PUBLICATIONS

"Explore YouTube—Don't Just Watch, Dive in!" YouTube, 2009, 2 pages, [online] [retrieved on Apr. 22, 2009] Retrieved from the internet <URL:http://www.youtube.com/t/explore_youtube>.

(Continued)

*Primary Examiner* — Maceeh Anwari
(74) *Attorney, Agent, or Firm* — Fenwick & West LLP

(57) ABSTRACT

A system, method and various user interfaces enable visually browsing multiple groups of video recommendations. A video stream includes a group of videos to be viewed and commented by users who join the stream. Users who join a stream form a stream community. In a stream community, community members can add videos to the stream and interact collaboratively with others community members, such as chatting in real time with each other while viewing a video. With streams, a user can create a virtual room in an online video content distribution environment to watch videos of the streams and interact with others while sharing videos simultaneously. Consequently, users have an enhanced video viewing and sharing experience.

20 Claims, 15 Drawing Sheets

(56) References Cited

U.S. PATENT DOCUMENTS

2009/0077170 A1 3/2009 Milburn et al.
2009/0249222 A1 10/2009 Schmidt et al.
2012/0102111 A1 4/2012 Salesky et al.

OTHER PUBLICATIONS

"How to Make a Youtube Stream," YouTube, uploaded on Jul. 12, 2007, 2 pages, [online] [retrieved on Apr. 5, 2011] Retrieved from the internet <URL:http://www.youtube.com/watch?v=XZrlHPyC0bQ>.

"Stickam Newsletter—Dec. 2008," Stickam Blog—Press Release, Dec. 2008, [online] [Retrieved on Jan. 15, 2009] Retrieved from the internet URL:http://blog.stickam.com/index.php/category/pr/press-release/>.

"Streams" YouTube, LLC, 2009, 3 pages, [online] [retrieved on Apr. 22, 2009] Retrieved from the internet <URL:http://www.youtube.com/streams_main>.

"TestTube" YouTube, LLC, 2009, 1 page, [online] [retrieved on Apr. 22, 2009] Retrieved from the internet <URL:http://www.youtube.com/testtube>.

"Turntable," turntable.fm, inc., 2011, 1 page, [retrieved on Dec. 20, 2011] Retrieved from the Internet <URL:http://turntable.fm/>.

"Wesker's V.I.P.S," YouTube Streams, YouTube, LLC, 2009, 1 page.

"YouTube Leanback offers effortless viewing," YouTube, Jul. 7, 2010, 19 pages, [online] [retrieved on Dec. 21, 2011] retrieved from the internet <URL:http://youtube-global.blogspot.com/2010/07/youtube-leanback-offers-effortless.html>.

Cashmore, P., "Lycos Cinema Launces—YouTube for Movies," Mashable, Nov. 13, 2006, 2 pages.

Cashmore, P., "YouTube's Test Tube, Streams," Mashable, Dec. 9, 2006, 3 pages, [online] [retrieved on Apr. 5, 2011] Retrieved from the internet <URL:http://mashable.com/2006/12/09/youtube-test-tube/>.

Chitu, A., "More About Google+ Hangouts," Google Operating System, Jun. 28, 2011, 3 pages, [online] [retrieved on Dec. 21, 2011] retrieved from the internet <URL:http://googlesystem.blogspot.com/2011/06/more-about-google-hangouts.html>.

Webpage for "Hulu.com"Hulu, 2011, 5 pages, [Archived on web.archive.org on Jul. 23, 2011] [retrieved from the internet on Dec. 20, 2011] retrieved from the internet <URL://http://web.archive.org/web/20110723144028/http://www.hulu.com/>.

Wikipedia "YouTube"retrieved on May 21, 2013 from <URL http://en.wikipedia.org/wiki/YouTube>.

YouTube, Inc., "Most Subscribed Channels (All Time)," Archived on Web.archive.org on Sep. 3, 2006, 1 Page [online] [retrieved on May 7, 2013] Retrieved from the internet <URL:http://web.archive.org/web/20060903035149/http://www.youtube.com/members?s=ms&t=a&g=0>.

United States Patent and Trademark Office, Non-final Rejection, U.S. Appl. No. 11/952,054, Jun. 3, 2013, 10 Pages.

United States Patent and Trademark Office, Non-final Rejection, U.S. Appl. No. 11/952,054, Feb. 9, 2011, 14 Pages.

United States Patent and Trademark Office, Non-final Rejection, U.S. Appl. No. 11/952,054, Jul. 23, 2010, 12 Pages.

Office Action for U.S. Appl. No. 14/196,086, Apr. 9, 2015, 9 Pages.

* cited by examiner

YouTube
Broadcast Yourself
Create/Edit Stream
Create or edit your stream by filling out the form below. (*Indicates required field)

Stream Name: * — 812
Background Image: — 814
　This image must be hosted from an external server, so please enter the complete URL. For example: http://www.example.com/image.gif
Welcome Message: — 816
　This message will appear to users when they join your stream.
Maximum # of Users: — 818
　This sets the maximum # of people who can be in your stream at the same time. The maximum allowed by YouTube is 300.
# of Flags to Remove Video: — 820
　This sets the number of times a video must be flagged by people in your stream before it is removed from the stream automatically.
☐ Allow Racy Videos in Stream — 822
Who can add Videos to this Stream: Everyone ▾ — 824
Save Stream Info — 826

FIG. 8A

YouTube
Broadcast Yourself

Create/Edit Stream

Create or edit your stream by filling out the form below. (*Indicates required field)

Stream Name: [test] * — 812
Background Image: [        ] — 814
This image must be hosted from an external server, so please enter the complete URL. For example: http://www.example.com/image.gif
Welcome Message: [Welcome to mystream|] — 816
This message will appear to users when they join your stream.
Maximum # of Users: [55] — 818
This sets the maximum # of people who can be in your stream at the same time. The maximum allowed by YouTube is 300.
# of Flags to Remove Video: [1] — 820
This sets the number of times a video must be flagged by people in your stream before it is removed from the stream automatically.
☐ Allow Racy Videos in Stream — 822
Who can add Videos to this Stream: [Everyone ▾] — 824
[Save Stream Info] — 826

FIG. 8B

COLLABORATIVE STREAMING OF VIDEO CONTENT

CROSS-REFERENCE TO RELATED APPLICATIONS

This application is a continuation of co-pending U.S. application Ser. No. 11/952,054, filed on Dec. 6, 2007, which claims the benefit of U.S. Provisional Patent Application No. 60/873,538, filed on Dec. 6, 2006, entitled "COLLABORATIVE STREAMING OF VIDEO CONTENT" and the benefit of U.S. Provisional Patent Application No. 60/875,670, filed on Dec. 18, 2006, entitled "COLLABORATIVE STREAMING OF VIDEO CONTENT," all of which are incorporated by reference in their entirety.

BACKGROUND

1. Field of Art

The present invention relates generally to web-based video viewing and specifically to collaborative viewing of video in an online video content distribution system.

2. Description of the Related Art

The expansion of networked video viewing provides users with rich opportunities to upload, watch and share videos in fast-growing online video entertainment communities. On average, many thousands of videos are posted every day, and this number is increasing as the tools and opportunities for capturing video become easier to use and more widespread. Video viewing sites such as YouTube allow content suppliers to upload video easily, automatically converting from many different formats, and to tag uploaded videos with keywords. Users can easily share videos by mailing links to others, or embedding them on web pages or in blogs. Users can also rate and comment on videos, bringing new social aspects to video viewing. Consequently, videos are no longer independent from each other, and neither are users in an online video sharing environment.

Videos are typically viewed at a video hosting website such as YouTube. Users browsing the video hosting website can find videos of interest by, for example, searching for videos, browsing video directories, or sorting videos by ratings assigned to the videos. Some video hosting sites allow users to create a video viewing channel associated with a personal account on the hosting website to upload videos, create video playlists, look at comments posted by other viewers, and other video viewing activities. Conventionally, an individual video viewing channel is preserved for the associated account holder with limited social interactions with other users. However, a conventional video viewing channel is not well suited for interactive video viewing and sharing.

SUMMARY

The present invention enables collaborative viewing of video content, including a method, system, and computer program product that receives a command from a client computer requesting collaborative video viewing service and provides the collaborative video viewing service. Embodiments of the collaborative video viewing method include receiving a command from a client computer, obtaining a video stream based on the command and providing a collaborative video viewing service to the client computer through the video stream. Embodiments of the collaborative video viewing system include a stream collaboration system, at least a stream collaboration module and a stream management module executed by the stream collaboration system, and a plurality of client computers. The stream collaboration module monitors user events associated with a plurality of video streams. The stream collaboration module further allows a client computer to create a video stream and add the newly created stream into the system. The stream management module manages videos of a stream, including adding videos to the stream, rating videos of the stream, deleting videos of the stream and adding users to real-time chatting service associated with the stream. The stream management module also manages client computers that join a stream, including temporarily or permanently banning a client computer from the collaborative video viewing service. Embodiments of the collaborative video viewing computer program product include a receiving module for receiving a command from a client computer, obtaining a video stream based on the command and providing collaborative video viewing service to the client computer.

BRIEF DESCRIPTION OF THE FIGURES

FIGS. 8A and 8B illustrate an exemplary interface for creating/editing a video stream according to one embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

It is to be understood that the Figures and descriptions of the present invention have been simplified to illustrate elements that are relevant for a clear understanding of the embodiments of the present invention, while eliminating, for the purpose of clarity, many other elements found in a typical web-based video player and method of using the same. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Figure 1:
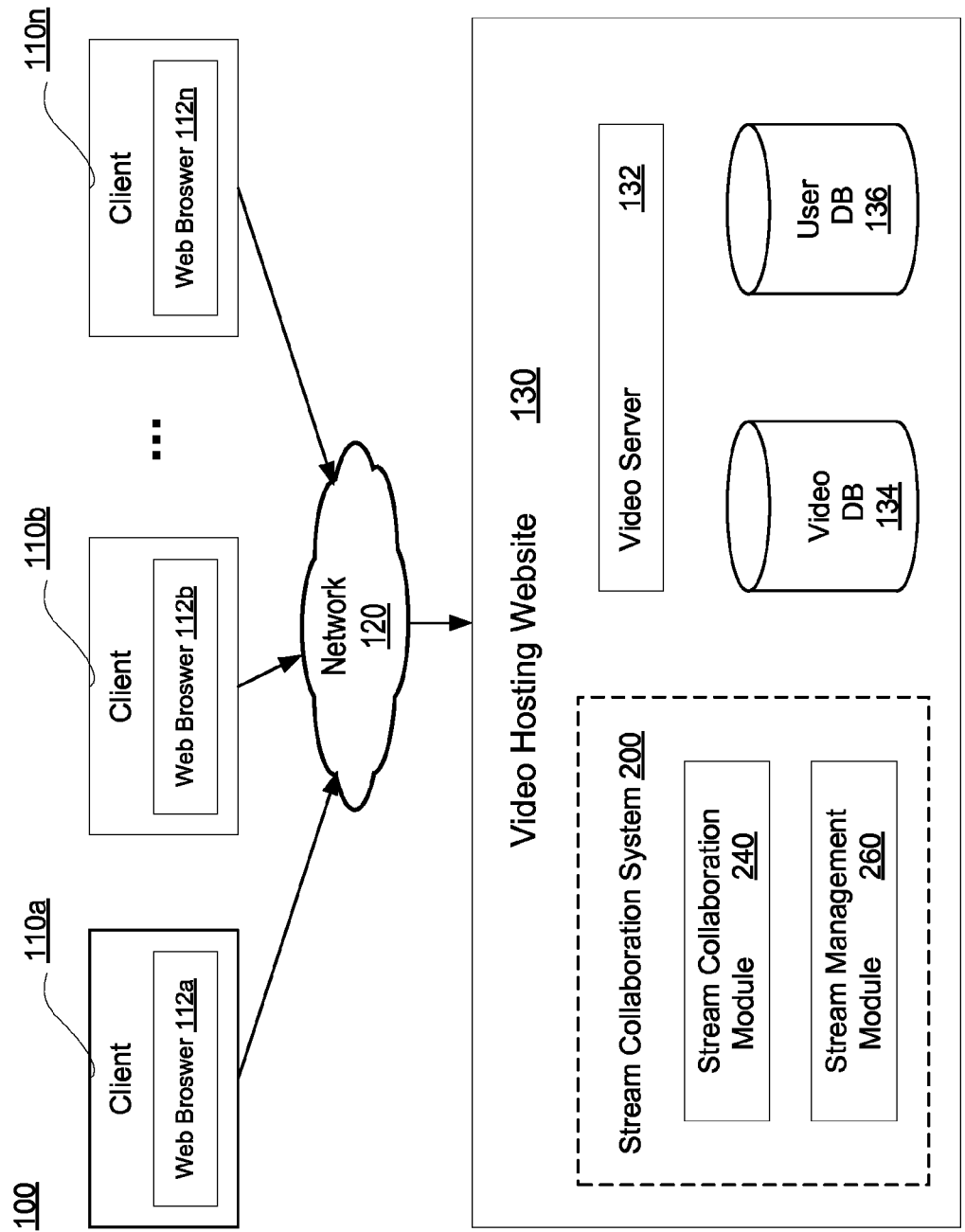
FIG. 1 is a block diagram of an environment having a collaborative video streaming system according to one embodiment.

FIG. 1 is a block diagram of an environment 100 having a collaborative video streaming system 200 (also called a collaborative viewing system) according to one embodiment. As shown in FIG. 1, a plurality of clients 110a-110n are connected to a video hosting website 130 via a computer network 120. A client 110 executes a web browser 112. The video hosting website 130 comprises a video server 132, a video database 134 and a user information database 136. The video hosting website 130 also comprises a stream collaboration system 200. Many conventional features, such as firewalls, load balancers, application servers, failover servers, site management tools, and so forth are not shown so as to more clearly illustrate the features of the system.

The client 110 communicates with the video hosting website 130 via the computer network 120. The client 110 can be a personal computer (PC) in one embodiment, or a mobile handset or other electronic computing devices in other embodiments. In some embodiments, the browser 112 include a third party video player, e.g., the Flash player from Adobe Systems, Inc., or any other player adapted for the video file formats used on the site 130. Typically, a user accesses a video from the site 130 by browsing a catalog of videos, conducting searches on keywords, reviewing playlists from other users or the system administrator, e.g., collections of videos forming channels, or viewing videos associated with particular user groups, e.g., communities. In some embodiments, browser 112 also accesses a video file indirectly, via an embedded video that is accessed via an embedded hyperlink in a third-party website.

Users of the client 110 and browser 112 can upload content, which can include, for example, video, audio, or a combination of video and audio, to the site 130, browse media content stored at the site 130, and collaboratively stream video content with other users at the site 130 via the network 120. The uploaded content is processed and placed for storage in the video database 134. This processing can include format conversion, compression, metadata tagging, and other data processing. In some embodiments, an uploaded content file is associated with the uploading user, and so the user's account record is updated in the user information database 136 as needed. In some embodiments, other data relating to the user is also placed for storage in database 136. For example, a list of videos that have been viewed by the user in the last ten days is kept in the user information database 136.

The network 120 enables communications among the client 110 and the video hosting website 130. In one embodiment, the network 120 uses standard communications technologies and/or protocols. Thus, the network 120 can include links using technologies such as Ethernet, 802.11, integrated services digital network (ISDN), digital subscriber line (DSL), asynchronous transfer mode (ATM), etc. The network 120 may also support mobile access using technologies such as Wideband Code Division Multiple Access (W-CDMA), CDMA200, Global System for Mobile Communications (GSM), General Packet Radio Service (GPRS), or similar technologies. Similarly, the networking protocols used on the network 120 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 120 can be represented using technologies and/or formats including the hypertext markup language (HTML), the extensible markup language (XML), etc. In addition, all or some of links can be encrypted using conventional encryption technologies such as the secure sockets layer (SSL), Secure HTTP and/or virtual private networks (VPNs) or Internet Protocol security (IPsec). In another embodiment, the entities can use custom and/or dedicated data communications technologies instead of, or in addition to, the ones described above.

For purposes of convenience and the description of one embodiment, the media content uploaded and browsed by a user will be referred to a "videos" or "video files", but no limitation on the types of media content that can be uploaded and browsed are intended by this terminology.

The video hosting website 130 allows users to upload videos to the website 130, browse the videos stored in the website 130, and collaboratively view video content in the website 130. In one embodiment as illustrated in FIG. 1, the video server 132 in the hosting website 130 receives videos uploaded to the site 130 and stores them in the video database 134. The video database 134 may contain a plurality of logical partitions internally and one partition is for video "streams." The partition of the video database 134 for video streams may be further partitioned into sub-partitions for currently active streams and inactive streams. Similarly, the user information database 136 can contain partitions for user information associated with streams. A suitable website 130 for implementation of the system is YouTube; other video hosting sites are known as well, and can be adapted to operate according the teaching disclosed herein. The various servers are conventionally implemented, whether as a single piece of software or hardware or as multiple pieces of software or hardware. In general, functions described in one embodiment as being performed on the server side can also be performed on the client side in other embodiments if appropriate.

The stream collaboration system 200 provides users of the site 130 with an enhanced user experience of interacting with other users while sharing videos. The stream collaboration system 200 comprises a stream collaboration module 240 and a stream management module 260. A stream in the context of the following description refers a group of videos which are available for being collaboratively shared by users who join the stream. With streams, a user can create a viewing room in the site 130 to watch videos of the streams and interact with others while viewing videos. For example, users who join a stream can add videos from their list of favorite videos, playlists, or by pasting links into the stream created by a stream owner, i.e., stream creator. Furthermore, users who join a stream are automatically members of a chat room associated with the stream. As users watch videos from the stream, they can chat in real time about the videos they are watching (or any other topics). In one embodiment, users view the same video at the same time. In one embodiment, users view different videos of the stream at the same time.

Figure 2:
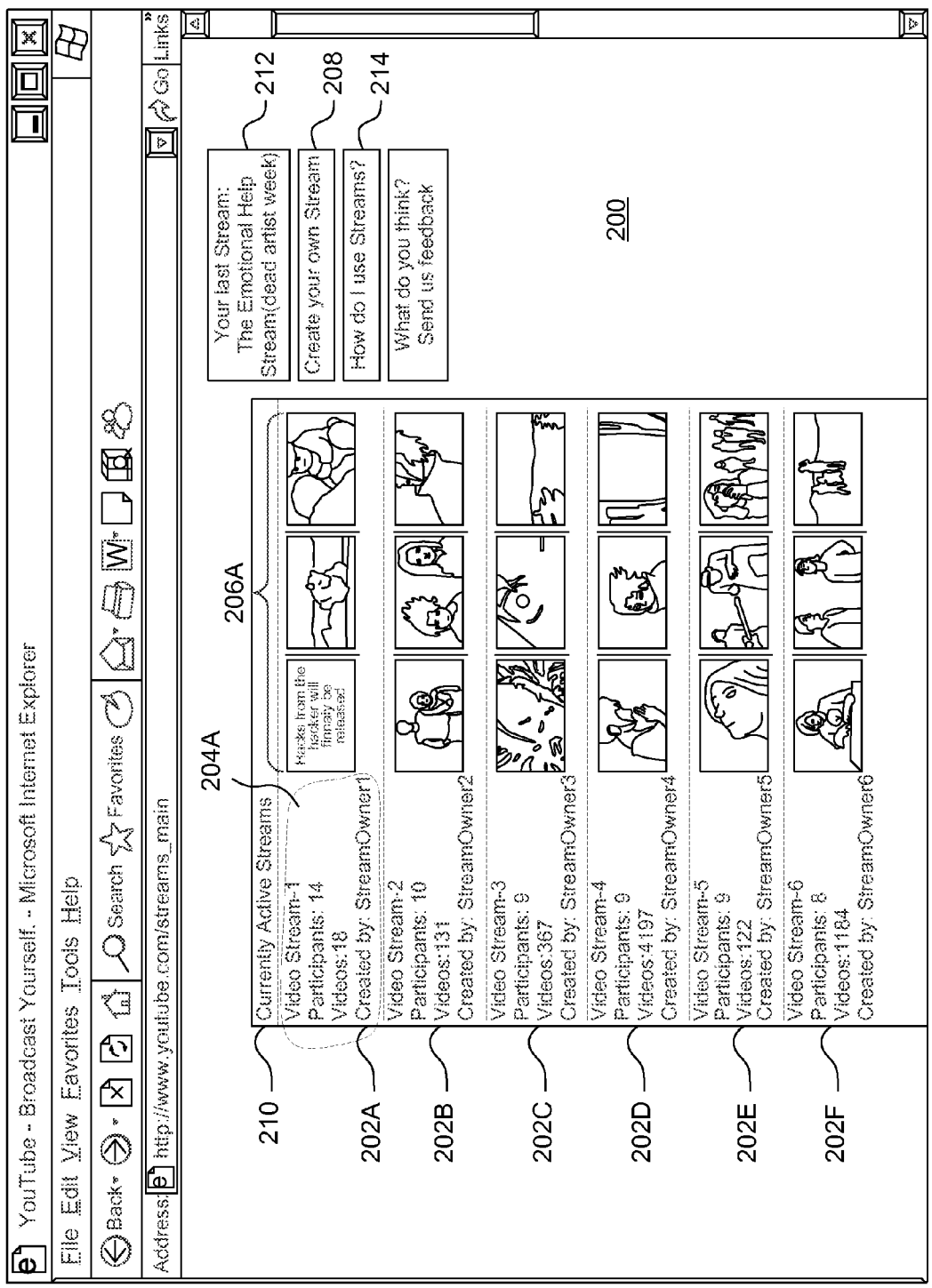
FIG. 2 is a web page implementing an exemplary interface of collaborative streaming video content according to one embodiment.

FIG. 2 is a web page implementing an exemplary interface of collaborative video content by the stream collaboration system 200 according to one embodiment. The exemplary interface is a default interface of the stream collaboration system 200 displayed to a user who logs into the collaboration system 200. The interface includes a stream collaboration display window 210, which displays a portion of currently active streams, 202a-202f, in the collaboration system 200. An active stream 202 displayed comprises stream information 204 and a plurality of thumbnails of videos 206 in the stream 202. The stream information 204 includes a title of the stream, number of users that belong to the stream, number of the currently available videos in the stream and stream owner information. Taking the stream 202a as an example, the title of the stream 202a is "Video Stream-1" chosen by the stream owner. The stream 202a currently has 14 participants and 18 videos. The thumbnails 206a represent the first three videos of the stream 202a according to a playlist of the stream 202a. The stream 202a is created by StreamOwner1. A user can join a stream 202 by clicking the stream title of the selected stream 202, or follow "How do I use Streams'?" link 214 which automatically brings the user to a stream information and tools web page. A user can also preview the sample videos of the stream 202 by clicking the video thumbnails 206 of the stream 202. A user can also check the profile of a stream creator by clicking the stream creator's name, which automatically brings the user to the stream owner's profile page. Furthermore, a user can create his/her own stream to share videos and interact with other participants of his/her stream by following "Create your own Stream" 208 link which provides the user with stream creation tool. Once a user chooses to join a stream 202, the user is able to watch videos of the stream together with other stream participants, add his/her videos to the stream 202, interact with other stream participants, such as chatting with others while watching videos of the stream. Further detail on stream collaboration is presented in connection with the discussion of FIGS. 4, 5, 6 and 7.

To manage streams in the stream collaboration system 200, the stream collaboration module 240 manages stream creation, monitors user events, such as uploading videos, joining a selected stream, and updates stream collaboration system 200. For example, in one embodiment, the stream collaboration module 240 manages up to 600 active streams at one time in the stream collaboration system 200. An active stream can stream video content live for up to 2 hours. A stream is deleted by the stream collaboration module 240 three days after its creation, or if there has been no activity in the stream for a predetermined period of time.

Figure 3:
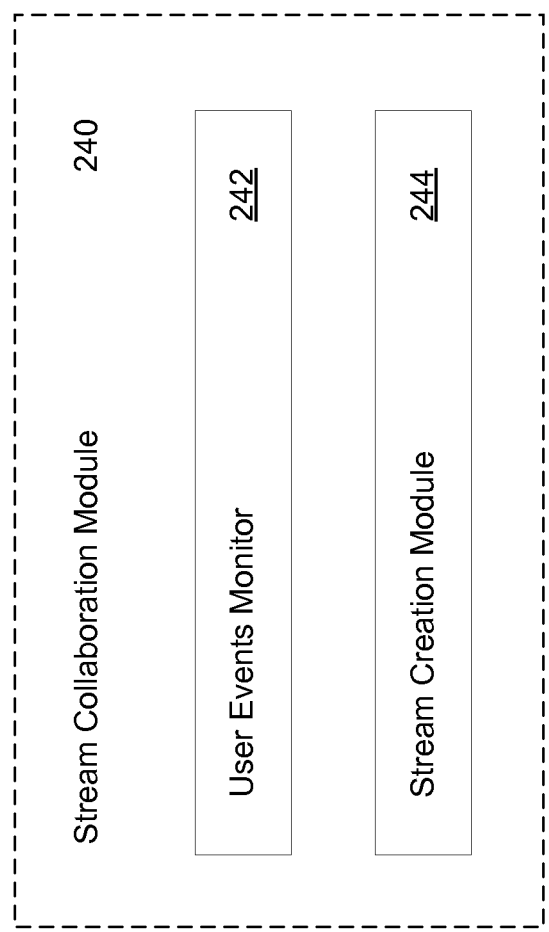
FIG. 3 is a block diagram illustrating modules within a stream collaboration module according to one embodiment.

FIG. 3 is a block diagram illustrating modules within a stream collaboration module 240 according to one embodiment. The stream collaboration module 240 includes a user events monitor 242 and a stream creation module 244. Other embodiments can have different and/or additional modules than the ones shown in the figure. In addition, the functions can be distributed among the modules in a different manner than is described here.

The user events monitor 242 monitors user initiated events in the stream collaboration system 200 and communicates with the stream creation module 244 and the stream management module 260. In one embodiment, the user events to be monitored by the events monitor 242 include user initiated events related to browsing currently active streams, joining a selected stream, previewing videos of a stream, checking stream creator's profile, creating a stream and sending feedbacks to the collaboration system 200. Other embodiments can have different and/or additional user initiated events than the ones described here.

Referring now back to FIG. 2, a user logs into the collaboration system 200 and gets a display window 210 of currently active streams to browse. In one embodiment, in response to user clicking the title of a selected stream for joining the selected stream, the user events monitor 242 records the selection of the stream and notifies the stream management module 260 for such event. In another embodiment, a user can join a stream by following links from emails or instant messages sent from others. In such cases, the event monitor 242 records the event in response to user clicking the links in the emails or instant messages and notifies the stream management module 260 for such event. In response to user clicking "Create your own stream" link 208 in FIG. 2, the event monitor 242 records the event and notifies the stream creation module 244 for such event. In response to user clicking a video thumbnail, the event monitor 242 notifies the stream management module 260 to launch a video player to play the selected video.

The stream creation module 244 allows a user to create a stream. In one embodiment, a user can create a stream by following "Create your own stream" link 208 in FIG. 2 after logging into the stream collaboration system 200. In another embodiment, a user can create a new stream while within a stream since a stream can have a link that allows a user to create his/her own stream while interacting with other users within the stream. In either case, in one embodiment, a user is presented an easy-to-follow stream creation web form with a plurality of fields to be filled in by the user. The fields of the stream creation form are designed to manage videos to be added to the stream and users who join the stream. For example, videos of a stream can be flagged before being deleted by the stream creator. [not clear] Users who join a stream, i.e., stream users, can be suspended or kicked off the stream for inappropriate behavior. Only authorized stream users can add videos to a stream. The stream creation module 244 updates the stream collaboration module 240 for each newly created stream. The stream collaboration module 240, in turn, updates the list of currently active streams, related partitions in the video database 134 and user database 136 if necessary. For example, the stream creation module 244 deletes expired and/or inactive streams, and searches video database 134 and user information database 136 for videos to be added to a stream and users who join a stream.

Referring now to FIG. 8A, an exemplary interface for stream creation is illustrated according to an embodiment. The exemplary interface includes a stream creation form to be filled by a stream creator. The stream creation form includes a plurality of fields, such as stream name 812 and background image 814. In one embodiment, a background image is hosted from an external server other than the video server 132 of FIG. 1 or the server for implementing the stream collaboration system 200. A stream owner needs to provide the complete URL for the location of the background image to be used, for example, "http://www.example.com/image.gif". The stream creation form also includes a welcome message field 816, which displays a welcome message from a stream owner when a user joins the stream. Other fields to be filled are maximum number of users 818 allowed to join the stream, number of flags needed to remove a video 820 for stream video management, and types of users allowed to add videos to the stream 824. In one embodiment, by default, everyone who joins the stream can add videos to the stream created by the stream owner. Other embodiments may only allow authorized stream users, such as stream creator, to add videos to a stream. The "Allow Racy Videos in Stream" checkbox 822 provides an option to add racy videos to a stream if checked. In one embodiment, only stream name field 812 is mandatory to be filled in order to create a stream and the rest of the fields of the stream creation form take default values, such as a null value, i.e., blank field value. In response to user clicking "Save Stream Info" bar 826, the stream creation form with filled field values is sent to the stream creation module 244 for stream creation. Once a stream is created, the stream owner becomes the first user of his/her own stream.

FIG. 8B is the corresponding stream creation form of FIG. 8A with sample fields values. For example, the filled stream creation form represents a stream called "test" 812, with no background image 814. The welcome message of the stream "test" is "Welcome to my stream!" 816. Up to 55 users 818 including the stream owner are allowed to participate in streaming video content in "test" stream. A video of "test" stream is allowed to be flagged once 820 before being deleted from the stream. No racy videos are allowed to be added to the stream, i.e., the unchecked "Allow Racy Videos in Stream" 822. Currently, every stream user of "test" is allowed to add his/her videos to the stream.

Figure 4:
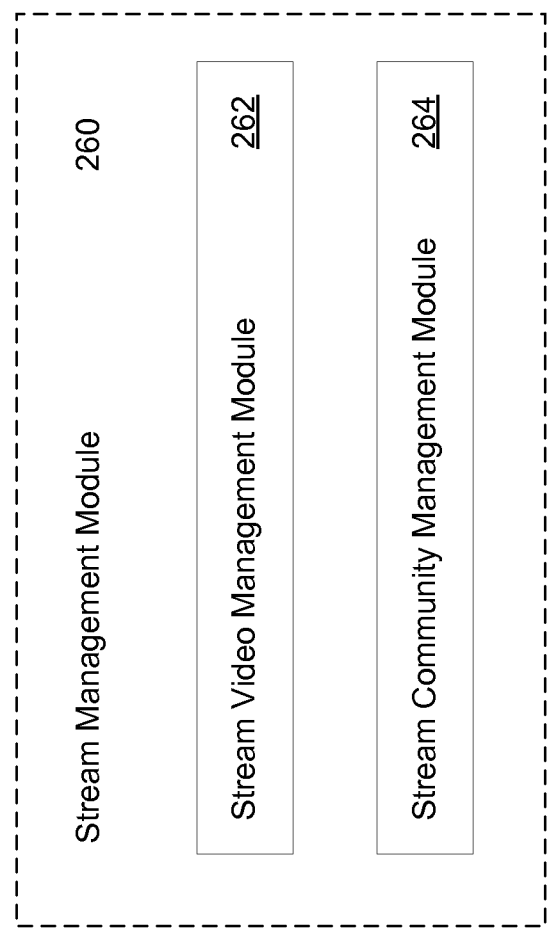
FIG. 4 is a block diagram illustrating modules within a stream management module according to one embodiment.

Once a stream is created, the stream collaboration system 200 creates a virtual room in the video hosting website 130 to allow multiple users to collaboratively share videos. In turn, such virtual room with its users becomes a stream community for collaboratively sharing videos. FIG. 4 is a block diagram illustrating modules within a stream management module 260 according to one embodiment. In one embodiment, the stream management module 260 includes a stream video management module 262 to manage videos of a stream, a stream community management module 264 to manage stream community, such as managing the chatting room associated with a stream and stream users.

Figure 5A:
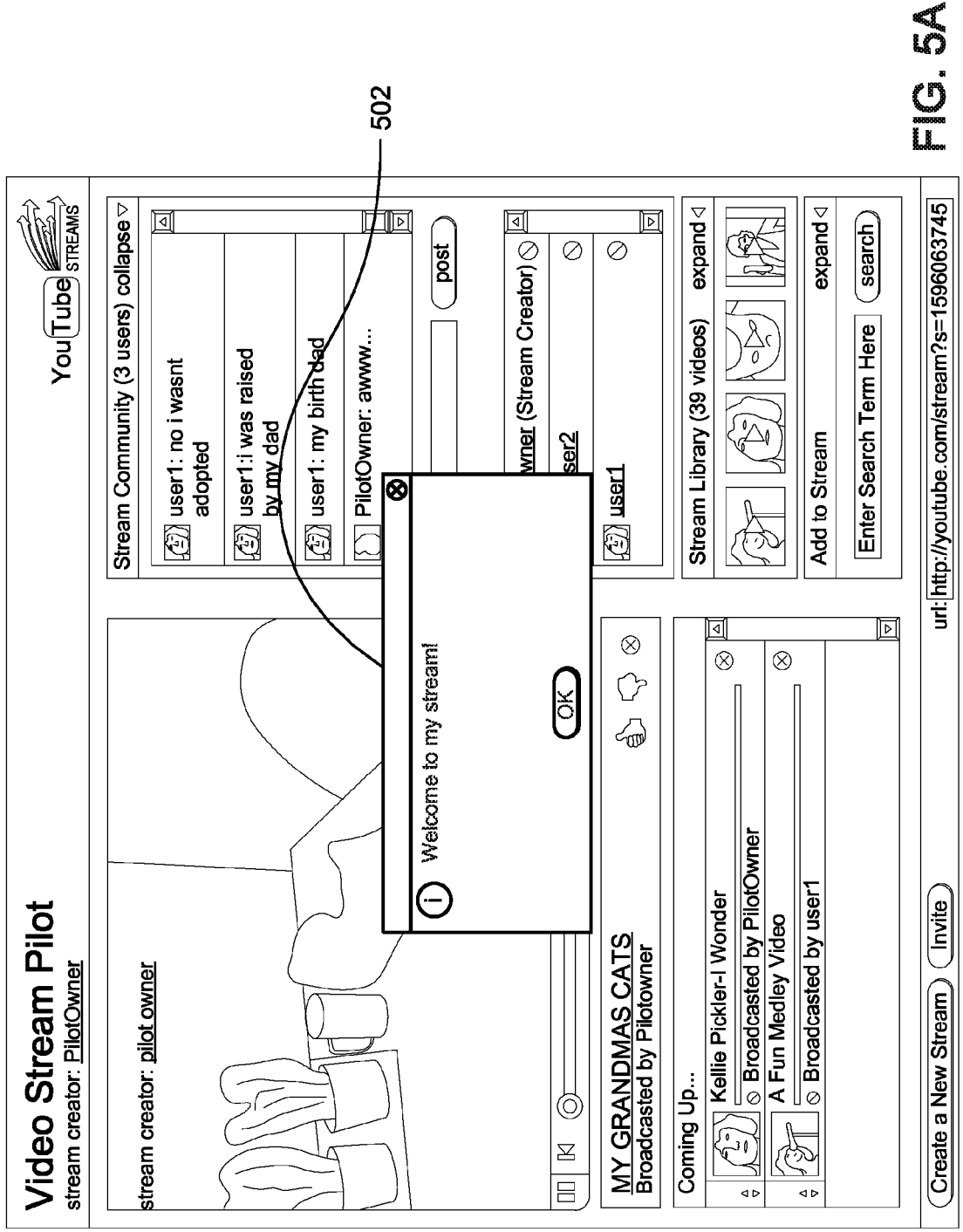
FIGS. 5A and 5B illustrate a web page implementing an exemplary interface of managing an individual video stream according to one embodiment.
Figure 5B:
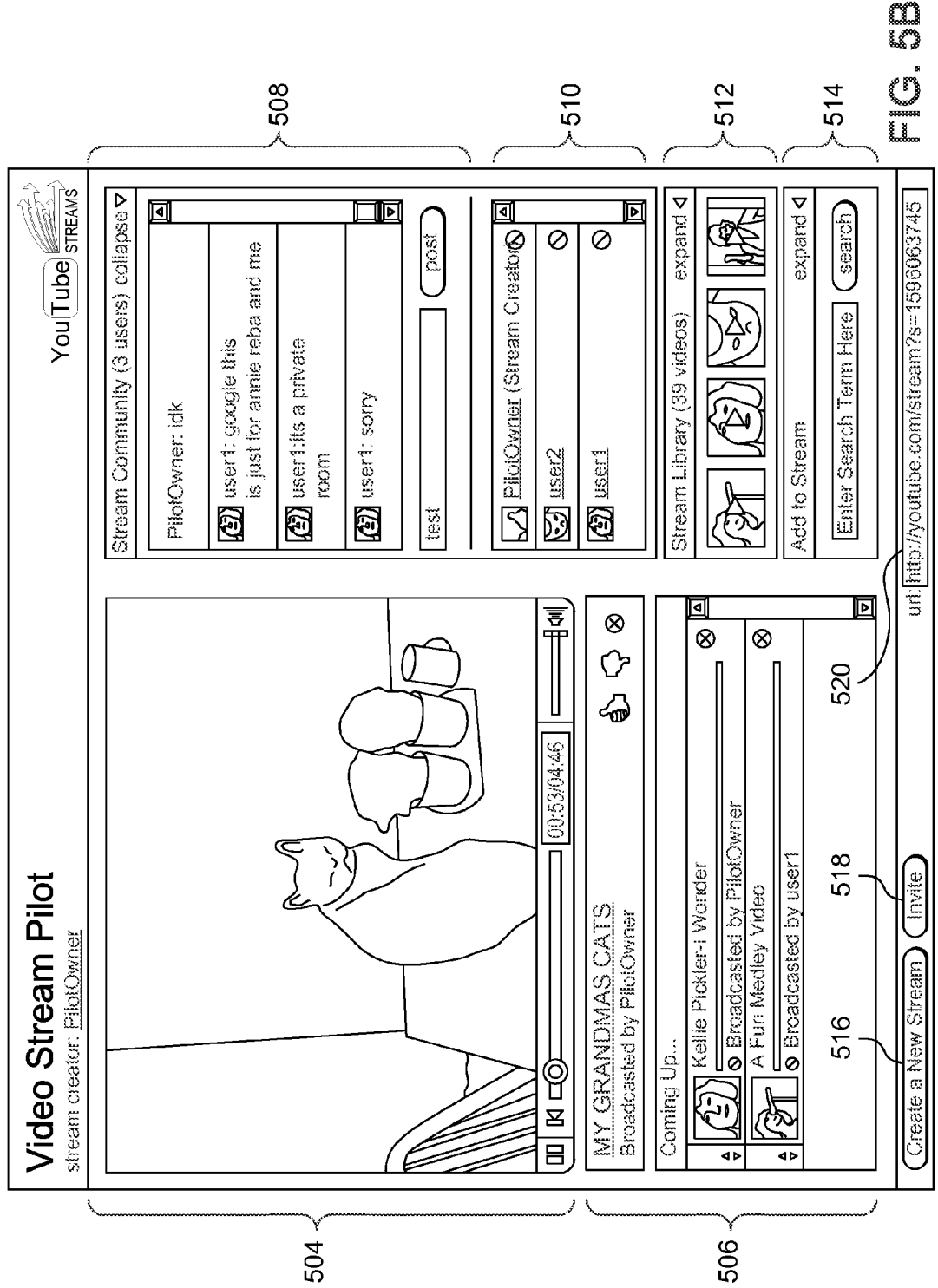

FIGS. 5A and 5B illustrate an exemplary interface of a stream community to be managed by the stream management module 260. FIG. 5A is a welcome page of a stream called "Video Stream Pilot", created by PilotOwner. The interface has a welcome message display window 502, currently displaying the welcome message from the stream creator, PilotOwner. In response to user clicking "OK" button, the stream management module 260 displays the stream "Video Stream Pilot" in ready mode for collaborative streaming as illustrated in FIG. 5B.

In one embodiment illustrated in FIG. 5B, the stream "Video Stream Pilot" has two major streaming collaboration areas: video viewing area 504 and stream community chatting room 508. The video viewing area 504 displays the video currently being viewed by the stream user, i.e., "My GRANDMAS CATS". The video viewing in the viewing area 504 is enabled by a media player. The stream community chatting room 508 allows stream users to chat in real-time. The stream community illustrated in FIG. 5B, in one embodiment, also includes stream videos management areas 506 and 514, stream users management area 510, stream library 512, new stream creation 516 and stream expansion 518. The URL of the stream is displayed in stream URL window 520. Further details of stream videos management, stream community management are further described in conjunction with the description of FIGS. 6, and 7.

In one embodiment, the stream video management module 262 allows a video of a stream to be viewed, commented, and rated by all users who join the stream. The stream video management module 262 also allows a video to be added to the stream by authorized stream users through a plurality of means. For example, an authorized stream user can add a video selected from a video search, from the user's own video collections, such as "My Videos" and "My Favorites" folders, or pasting the URL of the video to be added. The stream video management module 262 also allows a video of a stream to be deleted by authorized users of the stream. An exemplary interface of implementing stream video management module 262 is further described in conjunction with the description of FIG. 6.

Figure 6:
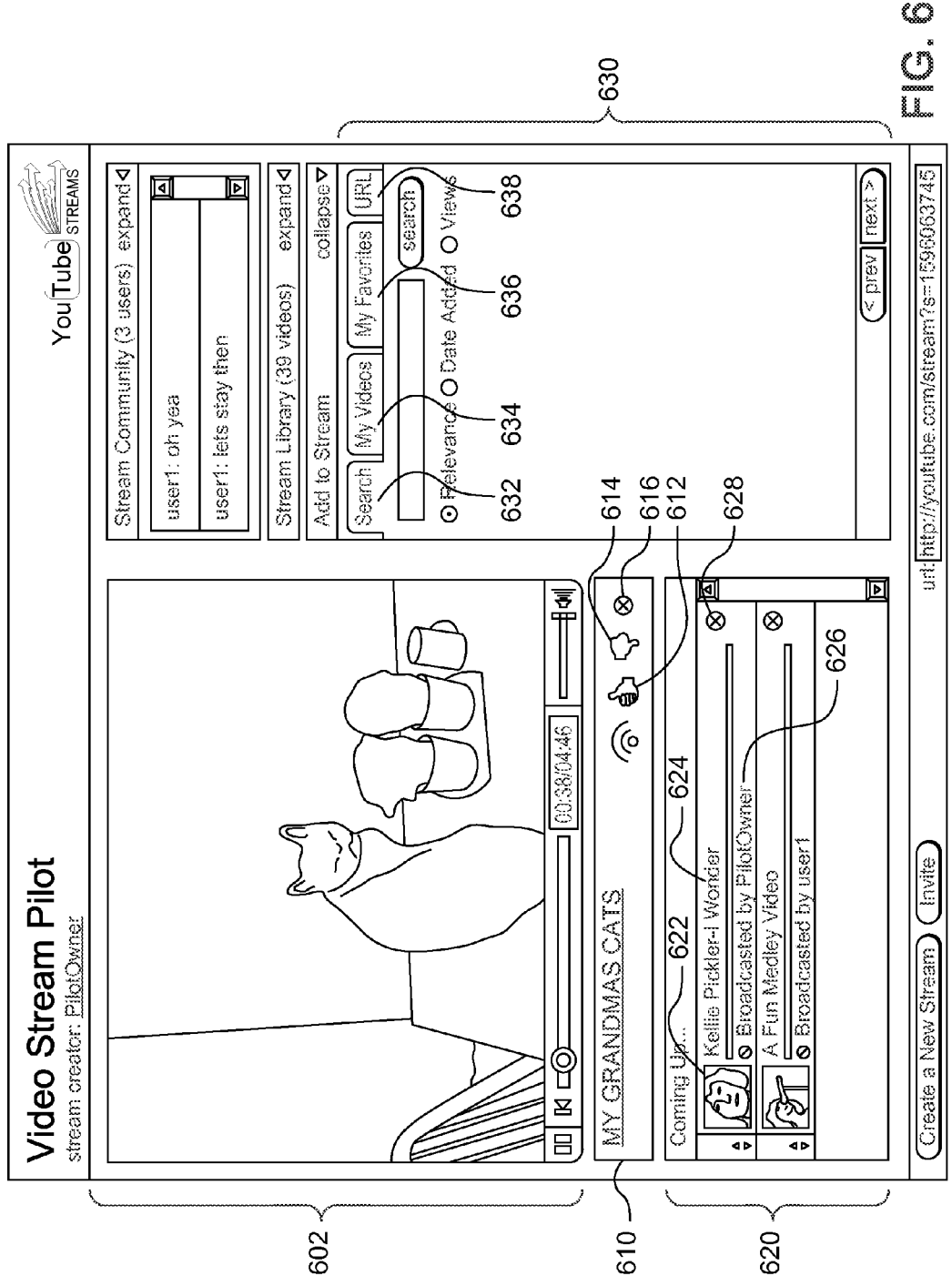
FIG. 6 illustrates a web page implementing an exemplary interface of managing videos in a stream according to one embodiment.

As described above, a stream refers a group of videos which are available for being collaboratively viewed by users who join the stream. The videos of a stream are managed by the stream video management module 262. FIG. 6 is an exemplary interface illustrating an implementation of managing videos in a stream according to one embodiment. The interface includes a video display area 602, which is currently playing a video called "MY GRANDMAS CATS" 610. The video currently being played at 602 has a plurality of video management tools associated with it. For example, the thumb-up icon 612 and thumb-down icon 614 allow a stream user to rate the video being viewed as "good" and "bad", respectively. The deletion icon 616 allows authorized stream users, such as stream owner and stream administrator, to delete videos. A video of a stream is deleted, in one embodiment, due to low rating from the stream users. In another embodiment, a video of a stream may be deleted due to inappropriate content. Area 620 displays the current playlist of a current user. The user selects his playlist from the videos in the stream. The videos will play for the user in the order specified by the playlist. In one embodiment, all users share the same playlist. A video in the playlist may have a thumbnail icon 622 representing the video content, a title 624, the owner of the video and a management tool 628. Area 630 includes a group of ways to add video to the stream and a display area to show information of a plurality of videos to be added.

Taking the current playlist illustrated in FIG. 6 as an example, the current playlist includes two videos, "Kellie Pickler—I Wonder" and "A Fun Medley Video". The first video on the playlist, "Kellie Pickler—I Wonder", has a thumbnail icon 622 displayed on the left of the title 624, added by anniebeth30 626, who happens to be the stream creator. The deletion icon 628 allows this video to be deleted from the current playlist by an authorized stream user. The next video on the playlist, "A Fun Medley Video", is added by the stream user "user1". To add a video to the stream "Video Stream Pilot", a stream user may search the video hosting site 130 using the video searching tool 632. In one embodiment, a video search may be further refined by relevance, date added to the hosting site 130 or views. A stream user may also add videos from his/her own video collections, such as "My Videos" 634, or "My Favorites" 626, to the stream. Alternatively, a stream user may paste a URL 630 of the video to be added in the area box next to "Search" button. The video referenced by the URL may reside in a third-party website, or from another active stream on the video hosting site 130.

Once a stream owner creates a stream, the stream owner becomes the first community member of the stream. Other users become a stream community member by joining the stream voluntarily, or being invited by the stream owner. Together with the stream owner, these community members form a stream community associated with the stream for collaboratively streaming activities. A stream community may include a plurality of stream users up to the maximum number of stream users specified during the stream creation, i.e., the "Maximum # of Users" field 818 in FIG. 8. A stream community may have a set of rules to manage its community members, i.e., stream users. A stream owner can invite others to join the stream. A stream community may include a stream library, which holds the videos added by the stream users to the stream.

Figure 7A:
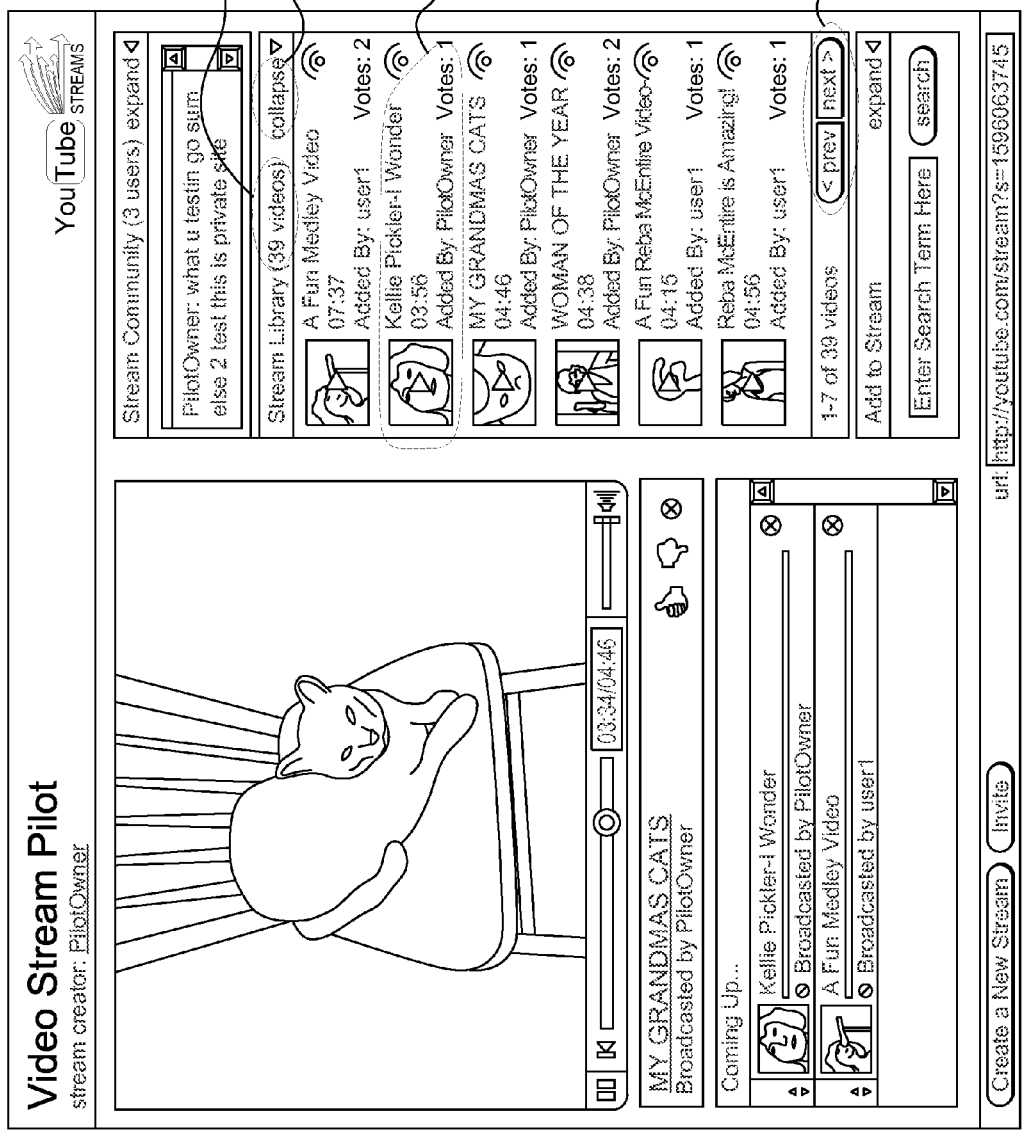
FIG. 7A illustrates a web page implementing an exemplary interface of managing stream library in a stream according to one embodiment.

FIG. 7A illustrates a web page implementing an exemplary interface for a stream library of a stream according to one embodiment. A stream library visually represents all videos of the stream. A video in a stream library is presented with a thumbnail of the video content, a title, length of time, owner of the video, number of votes from the community numbers. Depending on the number of votes a video gets, the video can be added to different location of the library, e.g., head of the library, middle or end of the library. In one embodiment, videos are added to the library according to the number of votes they get from the highest to the lowest votes. A video in a library may also have a "play" button embedded within the thumbnail that allows a stream user instantly plays the selected video. If a stream library is larger than a display screen can present, tools are provided to search through the stream library.

In the illustrated interface, the stream library of the stream "Video Stream Pilot" visually represents the videos added by the three stream community members in the display area 710. Currently, total 39 videos 714 are in the library, and 7 of them are currently displayed in the display area 710. The "prey" and "next" buttons 716 allows a user to go back and forth to have a display screen load of videos to be displayed. A "collapse" button 712 hides details of videos in the library and only includes total number of videos information 714. Alternatively, the "collapse" button 712 can change to "expand" to resume detailed display. Taking the current second video 714, "Kellie Pickler—I Wonder", displayed in area 710 as an example, it is represented by a thumbnail with a "play" button symbol in the middle. It lasts 3 minutes 56 seconds, added by the stream owner anniebeth30, and currently has 1 vote from the community.

Figure 7B:
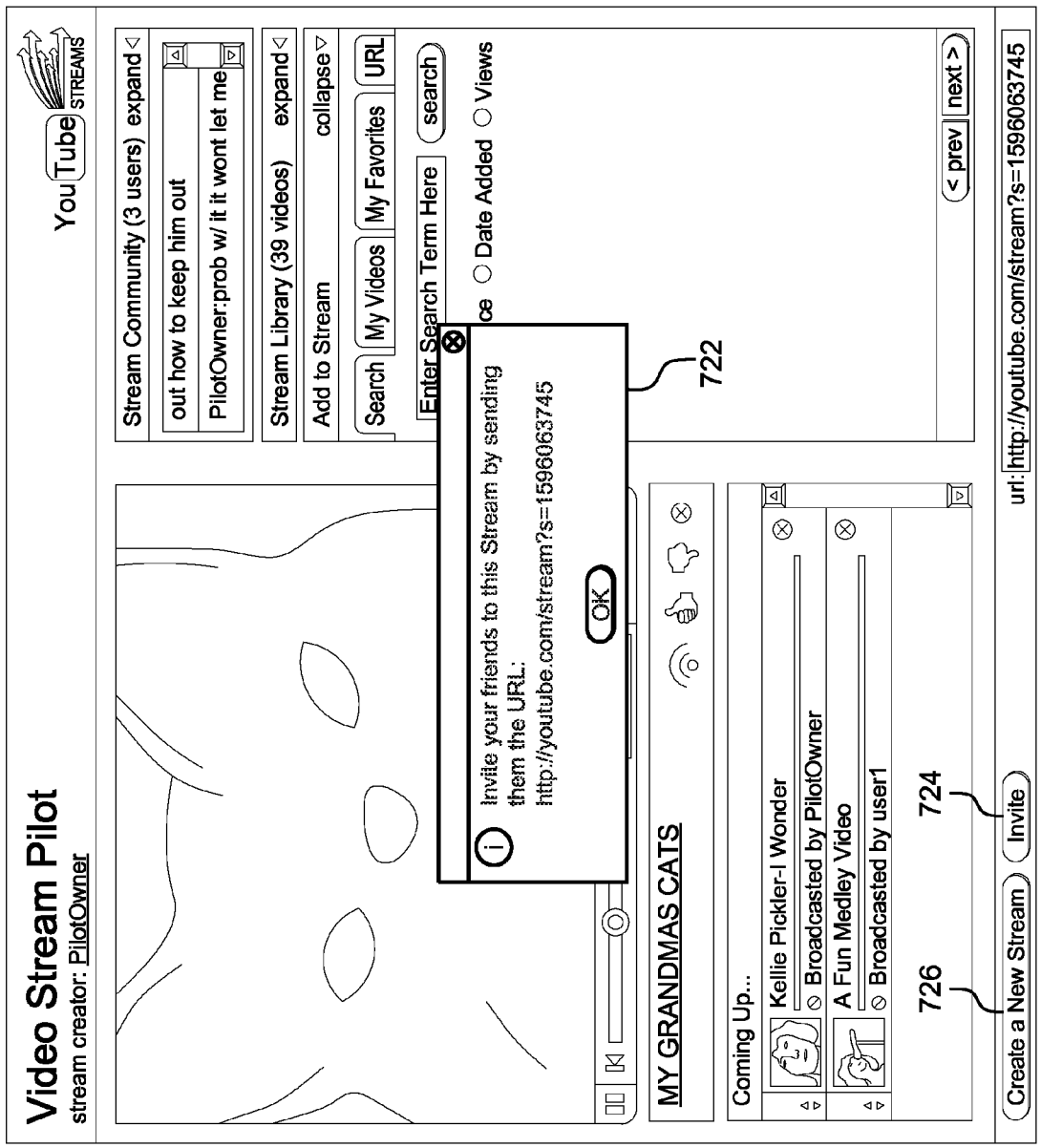
FIG. 7B illustrates a web page implementing an exemplary interface of inviting other users to a stream according to one embodiment.

As described above, a user other than a stream creator may join a stream voluntarily by clicking a selected stream title after logging into the collaboration system 200. A stream owner can also invite others to join his/her stream. FIG. 7B illustrates a web page implementing an exemplary interface for inviting other users to a stream according to one embodiment. The interface, in one embodiment illustrated in FIG. 7B, has an instruction page 722 from the collaboration system 200 after clicking the "invite" button 724. A stream owner can send a URL link of the stream to a friend via email, IM or other communications means. In this case, the URL for the stream, i.e., "http://youtube.comstream?s=1596063745", is listed in the instruction page 722. "s=1596063745" is an identification automatically generated by the collaboration system 200 when the stream is created and is used to identify and locate the stream in the video database 134. Similarly, a stream user may follow the similar steps described above to invite others to join the stream.

Stream community members can comment in real-time on a video currently being viewed or on any topics on the community members want to engage. In one embodiment, a stream community management module 264 manages a chatting room associated with the stream and stream users. A user may join a stream and its associated chat room separately. In another embodiment, users who join a stream are automatically members of the chat room associated with the stream. To manage stream community members in a chat room, in one embodiment, a stream creator can kick a user out of the stream temporarily for a predetermined period of time for improper behavior. In another embodiment, a stream creator can ban other community members permanently for improper behavior. Other embodiments may allow a stream creator to select other community members and give them administrator rights to help them manage the room. Alternatively, a community member may flag another community member for inappropriate behavior to the stream creator, but only the stream creator can actually ban the flagged user.

Figure 7C:
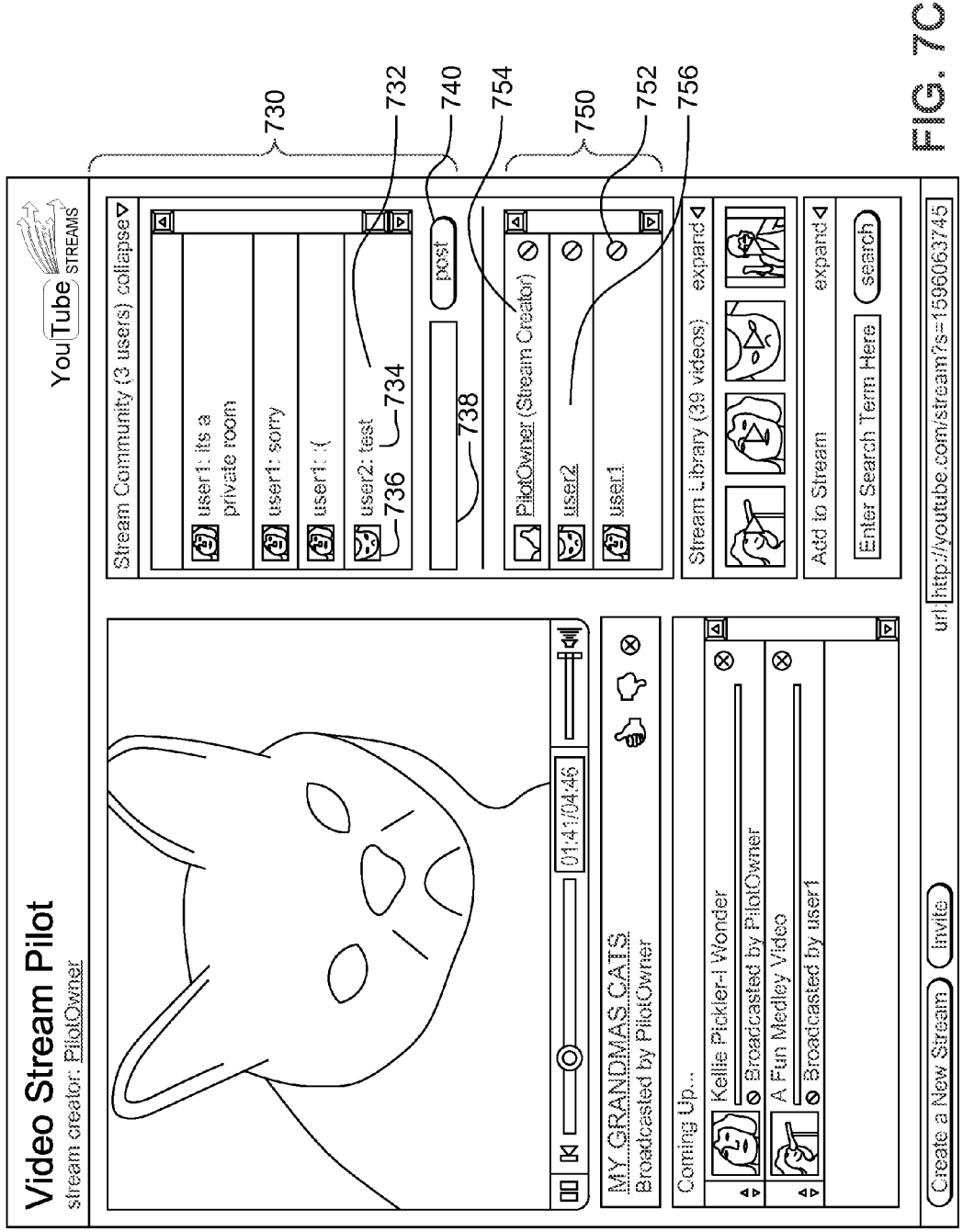
FIG. 7C illustrates a web page implementing an exemplary interface of managing real-time video commenting in a stream according to one embodiment.

FIG. 7C illustrates a web page implementing an exemplary interface for managing real-time video commenting in a stream according to one embodiment. The stream community chat room has a chatting/commenting area 730. An area 738 is where a community member enters his/her contribution to the commenting/chatting. Clicking "Post" button 740 instantly pushes the text entered by a community member. An area 750 displays community member information. A community member has a unique name 756, such as "user2". Special community members, such as stream creator 754, are individually labeled. A thumbnail of a video being watched by a community member is placed next to his/her name. A tool 752 allows a stream creator to hide videos or text messages in the chat room from a community member. For example, the community user 734, "user2", is currently watching "My Grandmas Cats", indicated by the thumbnail 736, and user2just posted a message "test" 732 in the chat room.

Figure 7D:
FIG. 7D illustrates an exemplary interface for managing users in a stream according to one embodiment.

To maintain order in the chat room, a stream creator can list all the community members in the room, set their status and choose actions to take. FIG. 7D illustrates an exemplary interface for managing users in a stream according to one embodiment. The interface has a management tool that allows the stream owner to list all users (excluding the stream creator) 742. In this case, only one community member, "user1", is in the community. User1's status 744 is "Normal". The stream creator chooses 746 to "Ban from stream" action on User1.

Figure 9:
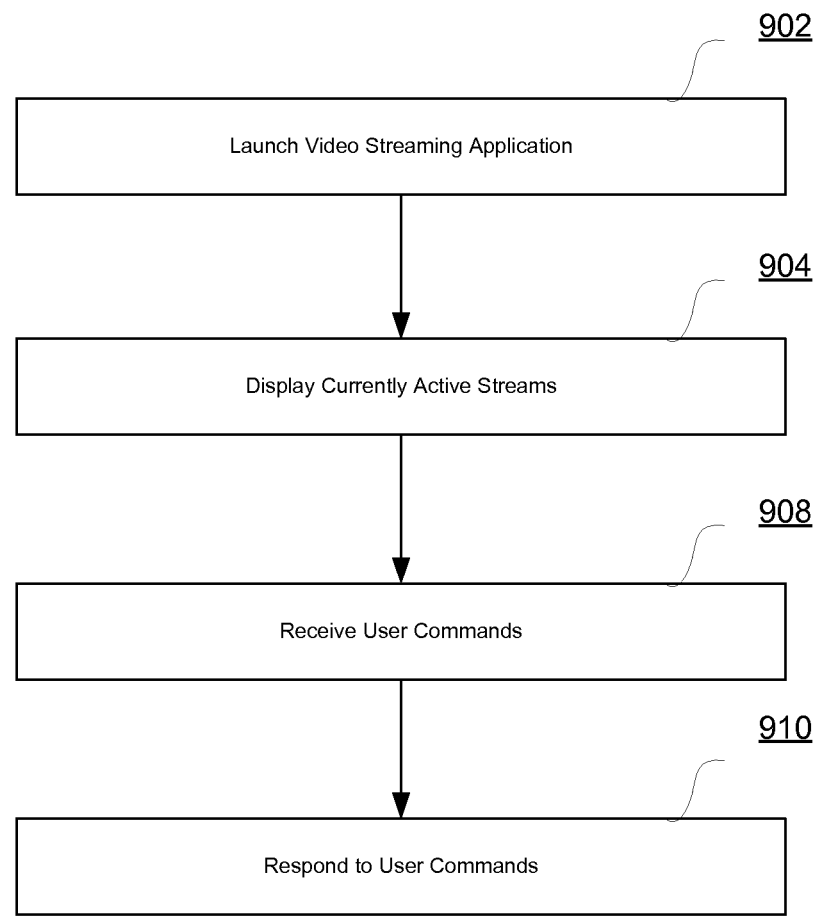
FIG. 9 illustrates a general process flow of using collaborative streaming of video content method according to one embodiment.

FIG. 9 illustrates a general process flow of using collaborative streaming of video content method according to one embodiment. Other embodiments perform different and/or additional steps than the ones described here. Moreover, other embodiments perform steps in different orders.

Initially, the stream collaboration system 200 launches 902 the video streaming application when a user logs into the system. The system 200 displays 904 a group of currently active streams by the stream collaboration module 240. Additionally, the stream collaboration module 240 may also display links to stream creation and/or stream participation tools page. The system 200 receives 906 user commands, such as joining a stream, creating a stream, chatting with other stream community members, playing a video of a stream and so on. In response 908 to user's command, the system 200 handles the user commands by the stream management module 260.

Figure 10:
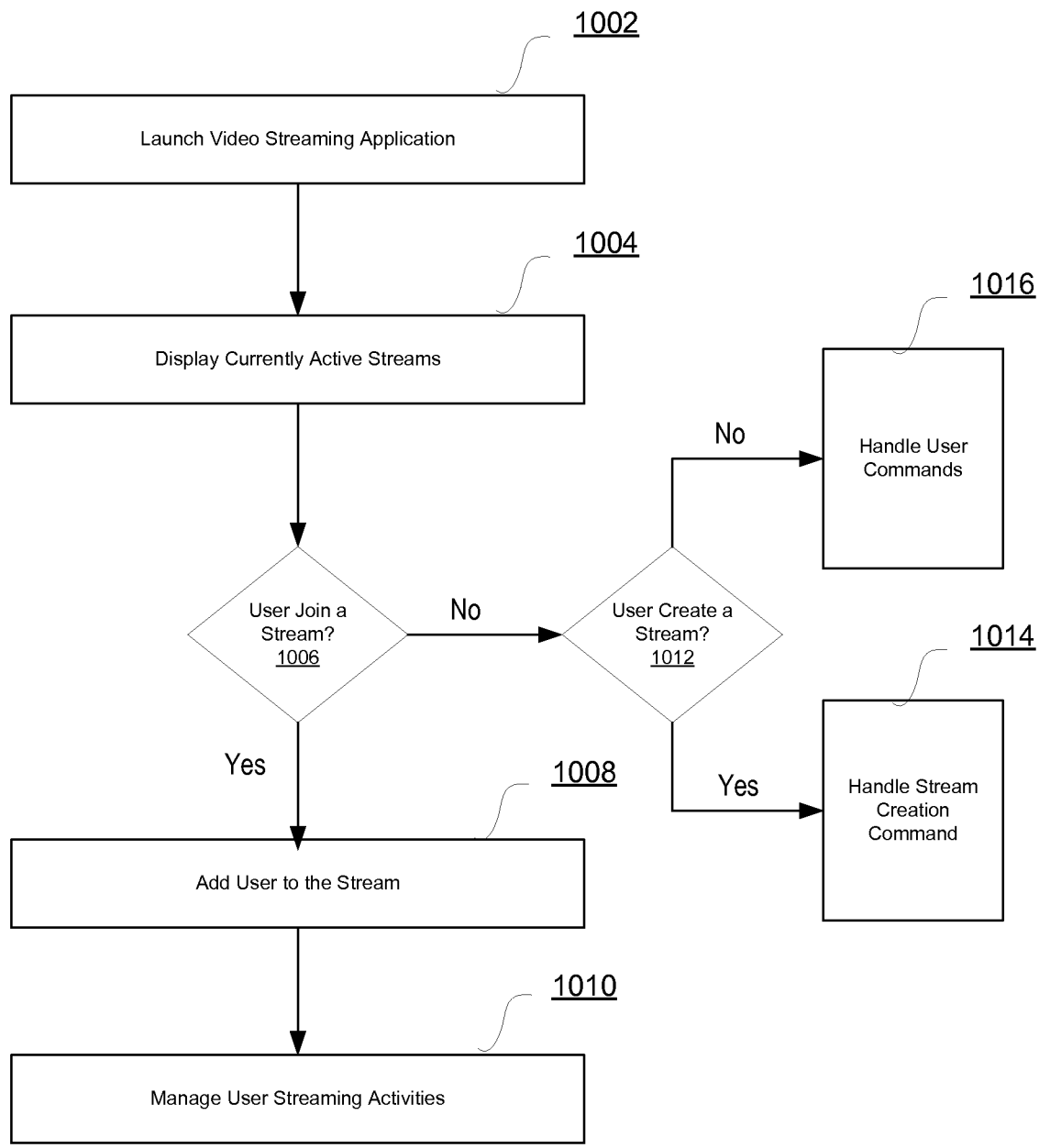
FIG. 10 illustrates a process flow of using collaborative streaming of video content method to join/create a stream according to one embodiment.

FIG. 10 illustrates a process flow of using collaborative streaming of video content method to join/create a stream according to one embodiment. Other embodiments perform different and/or additional steps than the ones described here. Moreover, other embodiments perform steps in different orders. For example, a user may request to create a stream first, and in response, the system handles the user's stream creation command first.

Initially, the stream collaboration system 200 launches 1002 the video streaming application when a user logs into the system. The system 200 displays 1004 a group of currently active streams by the stream collaboration module 240. Additionally, the stream collaboration module 240 may also display links to stream creation and/or stream participation tools page. In one embodiment illustrated in FIG. 10, a user desires to join 1006 a selected stream. In response to such user command, the stream collaboration module 240 adds 1008 the user to the selected stream, and the stream management module 260 manages 1010 the user's streaming activities. If the user desires to create 1012 his/her own stream, the system 200 handles 1014 the user stream creation request. For example, the system 200 presents a stream creation form to the user with required fields to be filled by the user. In response to user's clicking "Save Streaming Info", the system 200 creates a stream based on the user input. If user has other commands, such as playing a video of a stream, the system handles 1016 such user commands with appropriate modules, such as launching a video player to play the selected video.

Reference in the specification to "one embodiment" or to "an embodiment" means that a particular feature, structure, or characteristic described in connection with the embodiments is included in at least one embodiment of the invention. The appearances of the phrase "in one embodiment" or "a preferred embodiment" in various places in the specification are not necessarily all referring to the same embodiment.

Some portions of the above are presented in terms of methods and symbolic representations of operations on data bits within a computer memory. These descriptions and representations are the means used by those skilled in the art to most effectively convey the substance of their work to others skilled in the art. A method is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of a method. It should be noted that the process steps and instructions of the present invention can be embodied in software, firmware or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

While the invention has been particularly shown and described with reference to a preferred embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

We claim:

1. A computer-implemented method for collaboratively viewing video content, the method comprising:
using a computer processor configured to perform steps comprising:
creating a streaming community, the community including a manager, a plurality of users, a user interface, a community chat room and a video stream comprising a plurality of videos contributed by the manager and one or more users of the plurality of the users, the community chat room being a portion of the user interface, a user joining the streaming community automatically joining the community chat room;
concurrently displaying videos of the plurality of videos, in response to a request from a user in the community to view a video in the video stream, to the plurality of users in the user interface associated with the community such that the plurality of users viewing the same or different videos of the plurality of videos at the same time; and
while concurrently displaying videos of the plurality of videos to the plurality of users in the user interface, responsive to receiving a chat message from the user, displaying the chat message concurrently to the plurality of users in the community chat room, the chat message displayed concurrently with an indicia of a video of the video stream being displayed to the user.

2. The method of claim 1, wherein the indicia of the video comprises a thumbnail image representing the video being displayed to the user.

3. The method of claim 1, further comprising:
adaptively executing management instructions from the manager for managing the videos in the video stream.

4. The method of claim 3, wherein the management instructions comprise instructions for:
rejecting a video to be added to the video stream based on video content, the video contributed by one of the plurality of the users;
determining whether a video of the video stream is appropriate to be viewed by a subset of the plurality of the users based on video content;
deleting a video from the video stream in response to a video's rating reaching a predetermined threshold; and blocking one or more users of the plurality of the users from viewing a video of the video stream.

5. The method of claim 1, further comprising:
adaptively executing management instructions from the manager for managing the plurality of the users in the streaming community.

6. The method of claim 5, wherein the management instructions comprise instructions for:
blocking one or more users of the plurality of the users from viewing a video of the video stream;
blocking one or more users of the plurality of the users from viewing chat messages in the community chat room;
temporarily removing one or more users of the plurality of the users from the streaming community; and
permanently removing one or more users of the plurality of the users from the streaming community.

7. The method of claim 1, further comprising:
receiving a different chat message from a different user of the plurality of the users;
displaying the different chat message to the plurality of the users concurrently with an indicia of the different video being displayed to the different user.

8. A computer system for collaboratively viewing video content, the system comprising:
a non-transitory computer-readable storage medium storing executable computer modules, comprising:
a streaming community creation module for creating a streaming community, the community including a manager, a plurality of users, a user interface, a community chat room and a video stream comprising a plurality of videos contributed by the manager and one or more users of the plurality of the users, the community chat room being a portion of the user interface, a user joining the streaming community automatically joining the community chat room; and
a communication module for:
concurrently displaying videos of the plurality of videos, in response to a request from a user in the community to view a video in the video stream, to the plurality of users in the user interface associated with the community such that the plurality of users viewing the same or different videos of the plurality of videos at the same time; and
while concurrently displaying videos of the plurality of videos to the plurality of users in the user interface, responsive to receiving a chat message from the user, displaying the chat message concurrently to the plurality of users in the community chat room, the chat message displayed concurrently with an indicia of a video of the video stream being displayed to the user.

9. The system of claim 8, wherein the indicia of the video comprises a thumbnail image representing the video being displayed to the user.

10. The system of claim 8, further comprising a collaboration module for adaptively executing management instructions from the manager for managing the videos in the video stream.

11. The system of claim 10, wherein the management instructions comprise instructions for:
rejecting a video to be added to the video stream based on video content, the video contributed by one of the plurality of the users;
determining whether a video of the video stream is appropriate to be viewed by a subset of the plurality of the users based on video content;
deleting a video from the video stream in response to a video's rating reaching a predetermined threshold; and
blocking one or more users of the plurality of the users from viewing a video of the video stream.

12. The system of claim 8, wherein the collaboration module is further for adaptively executing management instructions from the manager for managing the plurality of the users in the streaming community.

13. The system of claim 12, wherein the management instructions comprise instructions for:
blocking one or more users of the plurality of the users from viewing a video of the video stream;
blocking one or more users of the plurality of the users from viewing chat messages in the community chat room;
temporarily removing one or more users of the plurality of the users from the streaming community; and
permanently removing one or more users of the plurality of the users from the streaming community.

14. The system of claim 8, wherein the communication module is further for:
receiving a different chat message from a different user of the plurality of the users;
displaying the different chat message to the plurality of the users concurrently with an indicia of the different video being displayed to the different user.

15. A non-transitory computer-readable storage medium containing executable computer program instructions for collaboratively viewing video content, the computer program instructions comprising instructions for:
creating a streaming community, the community including a manager, a plurality of users, a user interface, a community chat room and a video stream comprising a plurality of videos contributed by the manager and one or more users of the plurality of the users, the community chat room being a portion of the user interface, a user joining the streaming community automatically joining the community chat room;
concurrently displaying videos of the plurality of videos, in response to a request from a user in the community to view a video in the video stream, to the plurality of users in the user interface associated with the community such that the plurality of users viewing the same or different videos of the plurality of videos at the same time; and
while concurrently displaying videos of the plurality of videos to the plurality of users in the user interface, responsive to receiving a chat message from the user, displaying the chat message concurrently to the plurality of users in the community chat room, the chat message displayed concurrently with an indicia of a video of the video stream being displayed to the user.

16. The computer-readable storage medium of claim 15, wherein the indicia of the video comprises a thumbnail image representing the video being displayed to the user.

17. The computer-readable storage medium of claim 15, further comprising computer program instructions for adaptively executing management instructions from the manager for managing the videos in the video stream.

18. The computer-readable storage medium of claim 17, wherein the management instructions comprise instructions for:
rejecting a video to be added to the video stream based on video content, the video contributed by one of the plurality of the users;
determining whether a video of the video stream is appropriate to be viewed by a subset of the plurality of the users based on video content;

deleting a video from the video stream in response to a video's rating reaching a predetermined threshold; and blocking one or more users of the plurality of the users from viewing a video of the video stream.

19. The computer-readable storage medium of claim 15, further comprising computer program instructions for adaptively executing management instructions from the manager for managing the plurality of the users in the streaming community.

20. The computer-readable storage medium of claim 19, wherein the management instructions comprise instructions for:

blocking one or more users of the plurality of the users from viewing a video of the video stream;

blocking one or more users of the plurality of the users from viewing chat messages in the community chat room;

temporarily removing one or more users of the plurality of the users from the streaming community; and permanently removing one or more users of the plurality of the users from the streaming community.

* * * * *